(12) United States Patent
Moore et al.

(10) Patent No.: US 7,882,010 B2
(45) Date of Patent: Feb. 1, 2011

(54) OPENING PRICE PROCESS FOR TRADING SYSTEM

(75) Inventors: Daniel F. Moore, New Haven, CT (US);
Timothy Vincent, Shelton, CT (US);
Richard Justice, Lyme, NH (US); John T. Hughes, Jr., Stratford, CT (US);
Eugene A. Ryan, Shelton, CT (US); Yek Kwong Eng, New Providence, NJ (US);
Mark Denat, Bedford, NY (US); Peter J. Martyn, Ridgewood, NJ (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 1541 days.

(21) Appl. No.: 10/164,753

(22) Filed: Jun. 7, 2002

(65) Prior Publication Data

US 2003/0229563 A1 Dec. 11, 2003

(51) Int. Cl.
*G06Q 40/00* (2006.01)
(52) U.S. Cl. ...................................................... 705/37
(58) Field of Classification Search ............... 705/36 R, 705/37
See application file for complete search history.

(56) References Cited

U.S. PATENT DOCUMENTS

| | | | |
|---|---|---|---|
| 6,016,483 | A | 1/2000 | Rickard et al. |
| 7,406,447 | B2 * | 7/2008 | Moore et al. ................... 705/75 |
| 2002/0019795 | A1 | 2/2002 | Madoff et al. |
| 2002/0156719 | A1 | 10/2002 | Finebaum et al. |
| 2003/0135443 | A1 | 7/2003 | Moore et al. |
| 2009/0030834 | A1 * | 1/2009 | Moore et al. ................... 705/37 |

FOREIGN PATENT DOCUMENTS

WO    WO 01/22332 A2 *  3/2001

OTHER PUBLICATIONS

"The Nasdaq Stock Market, Inc. Best Practices Advisory." No. 2001-01; Jun. 29, 2001.*
Vanderpoten, Bruce. "Timing of bids at pooled real estate auctions." Journal of Real Estate Finance and Economics; vol. 5: 1992; pp. 255-267.*
"NASD Rulemaking: Notice of Filing of Proposed Rule Change and Amendment Nos. 1 and 2 Thereto Relating to the Establishment of the Nasdaq Order Display Facility and Modifications of the Nasdaq Trading Platform," retrieved from [URL: http://www.sec.gov/rules/sro/nd9953n.htm], published Nov. 22, 1999.*

* cited by examiner

*Primary Examiner*—Susanna M Diaz
(74) *Attorney, Agent, or Firm*—Fish & Richardson P.C.

(57) ABSTRACT

A system for determining an opening price for products traded over a distributed, networked computer system, includes a plurality of workstations for entering orders for financial products into the distributed, networked computer system and a server computer coupled to the workstations for receiving the orders. The server computer determines when a time just prior to an official opening time for opening regular trading has been reached, and executes a server process that determines an opening price for the product. The server process identifies the oldest of interest at the most aggressive price on each side of the market and selects the older interest of the identified interest to designate as initial interest. The server process matches initial interest against all contra side interest.

22 Claims, 18 Drawing Sheets

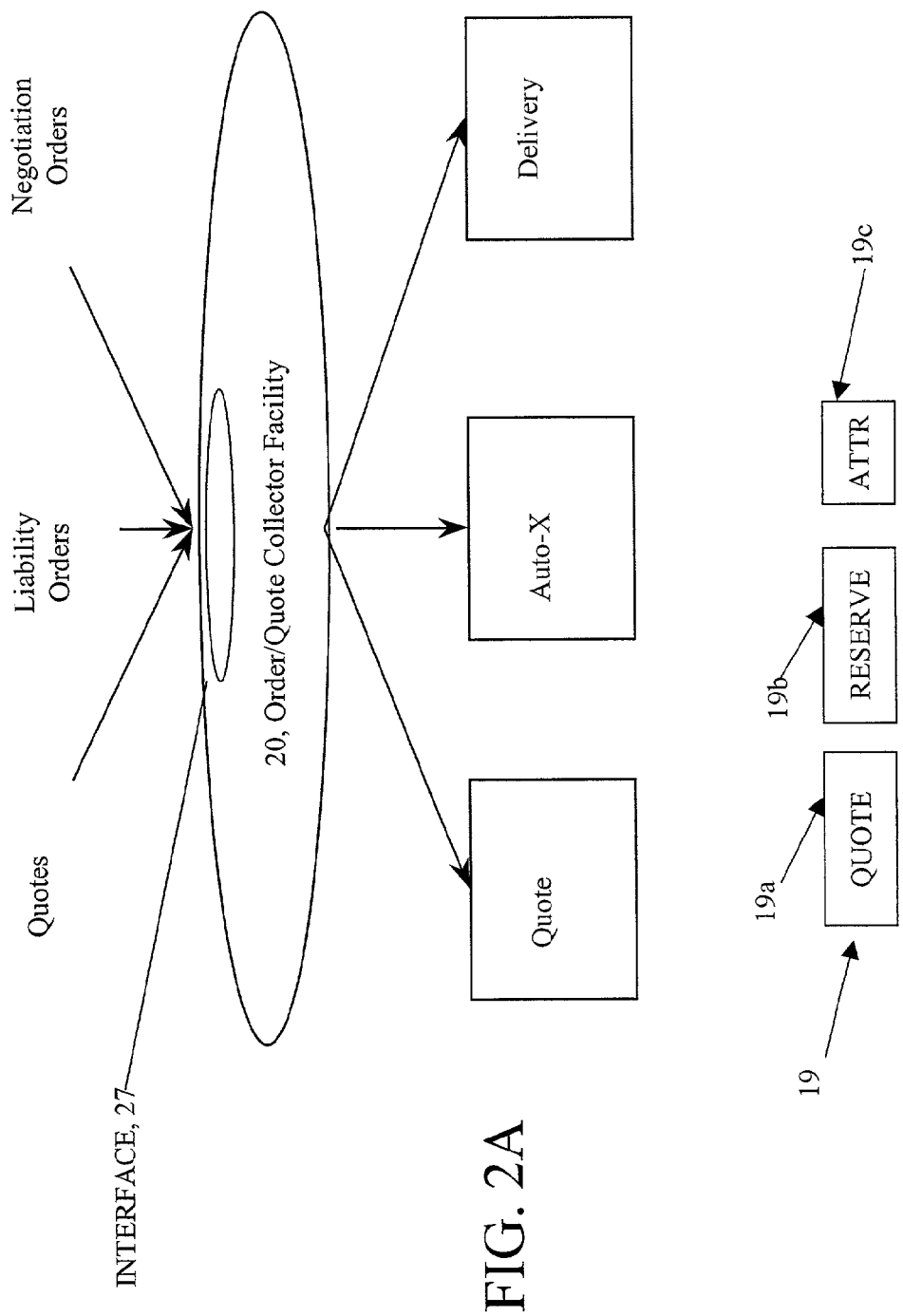

Display Prior to Locked/Crossed Clearing

Inside: $20.03 $20.02 Q 2,000 - 2,000    PCL: $20.01

Last: $20.01 Q +.00   Vol 0   Hi: $20.01   Low: $20.01

| | 20.01 - 20 | 20.02 - 25 | 20.03 - 20 | | 20.02 - 20 | 20.04 - 5 | 20.05 - 10 | |
|---|---|---|---|---|---|---|---|---|
| t11 | MLCO | | $20.03 | 1,000 | MADF | | $20.02 | 1,000 | t1 |
| t12 | FBCO | | $20.03 | 1,000 | RSSF | | $20.02 | 1,000 | t2 |
| t10 | GSCO | | $20.02 | 2,500 | SBSH | | $20.04 | 500 | t3 |
| t7 | ECN1 # | | $20.01 | 1,000 | FBCO | | $20.05 | 300 | t4 |
| t8 | SBSH | | $20.01 | 1,000 | GSCO | | $20.05 | 300 | t5 |
| t9 | ECN2 # | | $20.00 | 2,500 | MLCO | | $20.05 | 400 | t6 |

FIG. 6A

Display After Locked/Crossed Clearing

Inside: $20.02  $20.04  Q  2,000 - 500          PCL: $20.01

Last: $20.03  Q  +.02  09.30  Vol  2,000  Hi: $20.03  Low: $20.03

| 20.00 - 25 | 20.01 - 20 | 20.02 - 20 | | 20.04 - 5 | 20.05 - 10 | 20.06 - 5 |
|---|---|---|---|---|---|---|

| | | | | | | |
|---|---|---|---|---|---|---|
| GSCO | $20.02 | 2,000 | | SBSH | $20.04 | 500 |
| ECN1 # | $20.01 | 1,000 | | FBCO | $20.05 | 300 |
| SBSH | $20.01 | 1,000 | | GSCO | $20.05 | 300 |
| ECN2 # | $20.00 | 2,500 | | MLCO | $20.05 | 400 |
| | | | | ECN #1 | $20.06 | 500 |

FIG. 6B

Display Prior to Locked/Crossed Clearing

Inside: $20.04 $20.02 Q 500 - 1,000 PCL: $20.01

Last: $20.01 Q +.00 Vol 0 Hi: $20.01 Low: $20:01

| | | 20.00 - 25 | 20.01 - 55 | 20.04 - 5 | | | 20.02 - 10 | 20.03 - 10 | 20.04 - 5 | |
|---|---|---|---|---|---|---|---|---|---|---|
| t11 | MLCO | | $20.04 | 500 | | MADF | | $20.02 | 1,000 | t3 |
| t12 | FBCO | | $20.01 | 1,000 | | RSSF | | $20.03 | 1,000 | t2 |
| t10 | GSCO | | $20.01 | 2,500 | | SBSH | | $20.04 | 500 | t1 |
| t7 | ECN1 # | | $20.01 | 1,000 | | FBCO | | $20.05 | 300 | t4 |
| t8 | SBSH | | $20.01 | 1,000 | | GSCO | | $20.05 | 300 | t5 |
| t9 | ECN2 # | | $20.00 | 2,500 | | MLCO | | $20.05 | 400 | t6 |

FIG. 7A

Display After Locked/Crossed Clearing

Inside: $20.01 $20.02 Q 1,000 - 500     PCL: $20.01

Last: $20.04 Q +.03 09.30 Vol 500 Hi: $20.04 Low: $20:01

| 19.99 - 1 | 20.00 - 25 | 20.01 - 55 | | 20.02 - 5 | 20.03 - 10 | 20.04 - 5 |

| | | |
|---|---|---|
| FBCO | $20.01 | 1,000 |
| GSCO | $20.01 | 2,500 |
| ECN1 # | $20.01 | 1,000 |
| SBSH | $20.01 | 1,000 |
| ECN2 # | $20.00 | 2,500 |
| MLCO | $19.99 | 100 |

| | | |
|---|---|---|
| MADF | $20.02 | 500 |
| RSSF | $20.03 | 1,000 |
| SBSH | $20.04 | 500 |
| FBCO | $20.05 | 300 |
| GSCO | $20.05 | 300 |
| MLCO | $20.05 | 400 |

FIG. 7B

Display Prior to Locked/Crossed Clearing

Inside: $20.04 $20.02 Q 5000 - 1,000          PCL: $20.01

Last: $20.01 Q +.00  Vol 0  Hi: $20.01  Low: $20.01

| | | | | | | |
|---|---|---|---|---|---|---|
| | 20.00 - 25 | 20.01 - 55 | 20.04 - 50 | | 20.02 - 45 | 20.03 - 10 | 20.04 - 5 |

| | | | | | | |
|---|---|---|---|---|---|---|
| t11 | MLCO | $20.04 | 5,000 | MADF | $20.02 | 1,000 | t3 |
| t12 | FBCO | $20.01 | 1,000 | MADF | $20.02 | 3,500 | t13 |
| t10 | GSCO | $20.01 | 2,500 | RSSF | $20.03 | 1,000 | t2 |
| t7 | ECN1 # | $20.01 | 1,000 | SBSH | $20.04 | 500 | t1 |
| t8 | SBSH | $20.01 | 1,000 | FBCO | $20.05 | 300 | t4 |
| t9 | ECN2 # | $20.00 | 2,500 | GSCO | $20.05 | 300 | t5 |
| | | | | MLCO | $20.06 | 400 | t6 |

FIG. 8A

Display After Locked/Crossed Clearing

Inside: $20.01 $20.03 Q 1,000 - 500     PCL: $20.01

Last: $20.04 Q +.03 09.30 Vol 5000 Hi: $20.04 Low: $20.02

| 19.99 - 1 | 20.00 - 25 | 20.01 - 55 | | 20.03 - 5 | 20.04 - 5 | 20.05 - 6 |

| | | | | | | |
|---|---|---|---|---|---|---|
| FBCO | $20.01 | 1,000 | RSSF | $20.03 | | 500 |
| GSCO | $20.01 | 2,500 | SBSH | $20.04 | | 500 |
| ECN1 # | $20.01 | 1,000 | FBCO | $20.05 | | 300 |
| SBSH | $20.01 | 1,000 | GSCO | $20.05 | | 300 |
| ECN2 # | $20.00 | 2,500 | MLCO | $20.06 | | 400 |
| MLCO | $19.99 | 100 | | | | |

FIG. 8B

Display Prior to Locked/Crossed Clearing

Inside: $20.10  $20.02  Q 1,000 - 2,000  PCL: $20.01

Last: $20.01  Q +.00  Vol 0  Hi: $20.01  Low: $20:01

| | | | | | | | |
|---|---|---|---|---|---|---|---|
| 20.01 - 10 | 20.09 - 35 | 20.10 - 10 | | | 20.02 - 20 | 20.04 - 5 | 20.05 - 10 |
| t21 | MLCO | $20.10 | 1,000 | | MADF | $20.02 | 1,000 | t3 |
| t20 | FBCO | $20.09 | 1,000 | | RSSF | $20.02 | 1,000 | t15 |
| t19 | GSCO | $20.09 | 2,500 | | SBSH | $20.04 | 500 | t16 |
| t2 | ECN1 # | $20.01 | 1,000 | | FBCO | $20.05 | 300 | t4 |
| t5 | SBSH | $20.00 | 1,000 | | GSCO | $20.05 | 300 | t17 |
| t7 | ECN2 # | $19.99 | 2,500 | | MLCO | $20.05 | 400 | t18 |
| | | | | | MM1 | $20.06 | 200 | t10 |
| | | | | | MM2 | $20.06 | 100 | t13 |
| | | | | | MM3 | $20.07 | 400 | t8 |
| | | | | | MM4 | $20.08 | 500 | t6 |
| | | | | | MM5 | $20.08 | 1000 | t12 |
| | | | | | MM6 | $20.08 | 300 | t14 |
| | | | | | MM7 | $20.09 | 100 | t11 |
| | | | | | MM8 | $20.10 | 500 | t9 |
| | | | | | MM9 | $20.10 | 100 | t1 |

FIG. 9A

Display After Locked/Crossed Clearing

Inside: $20.01 $20.08 Q 1,000 - 1,500      PCL: $20.01

Last: $20.09 Q +.08 09.30 Vol 4,500 Hi: $20.10 Low: $20:09

| 19.99 - 25 | 20.00 - 10 | 20.01 - 10 | | 20.08 - 15 | 20.09 - 1 | 20.10 - 6 |
|---|---|---|---|---|---|---|

| ECN1 # | $20.01 | 1,000 | MM4 | $20.08 | 200 |
| SBSH | $20.00 | 1,000 | MM5 | $20.08 | 1000 |
| ECN2 # | $19.99 | 2,500 | MM6 | $20.08 | 300 |
| | | | MM7 | $20.09 | 100 |
| | | | MM8 | $20.10 | 500 |
| | | | MM9 | $20.10 | 100 |

FIG. 9B

Display Prior to Locked/Crossed Clearing

Inside: $20.04 $20.02 Q 4000 - 1,000   PCL: $20.01

Last: $20.01 Q +.00   Vol 0   Hi: $20.01   Low: $20.01

| | | | Reserve | | | | | Reserve | |
|---|---|---|---|---|---|---|---|---|---|
| t2 | 20.00 - 10 | 20.01 - 10 | 20.04 - 40 | | | 20.02 - 10 | 20.03 - 10 | 20.04 - 5 | | |
| t2 | MLCO | $20.04 | 500 | 4,000 | | MADF | $20.02 | 1,000 | 5,000 | t10 |
| t3 | FBCO | $20.04 | 1,000 | 1,000 | | RSSF | $20.03 | 1,000 | 2,000 | t12 |
| t11 | GSCO | $20.04 | 2,500 | 1,000 | | SBSH | $20.04 | 500 | 5,000 | t1 |
| t7 | ECN1 # | $20.01 | 1,000 | | | FBCO | $20.05 | 300 | | t4 |
| t8 | SBSH | $20.00 | 1,000 | | | GSCO | $20.05 | 300 | | t5 |
| t9 | ECN2 # | $19.99 | 2,500 | | | MLCO | $20.06 | 400 | | t6 |

FIG. 10A

Display After Reserve Trading

Inside: $20.01 $20.04 Q 1000 - 500    PCL: $20.01

Last: $20.04 Q +.03  Vol 10000  Hi: $20.04  Low: $20:02

|  |  | Reserve |  |  |  | Reserve |
|---|---|---|---|---|---|---|
| 19.99 - 25 | 20.00 - 10 | 20.01 - 10 |  | 20.04 - 5 | 20.05 - 6 | 20.06 - 4 |
| ECN1 # | $20.01 | 1,000 |  | SBSH | $20.04 | 500 |
| SBSH | $20.00 | 1,000 |  | FBCO | $20.05 | 300 |
| ECN2 # | $19.99 | 2,500 |  | GSCO | $20.05 | 300 |
|  |  | 0 |  | MLCO | $20.06 | 400 |
|  |  |  |  |  |  | 4,000 |
|  |  |  |  |  |  | * ??? |

\* or 1000 display, 3500 reserve?

FIG. 10B

OPENING PRICE PROCESS FOR TRADING SYSTEM

BACKGROUND

This invention relates to determining an opening price in an automated trading system for trading products such as equity securities.

In any trading system or market, there exists the possibility that at the opening of trading, the volume and prices of buy orders will not balance the volume and prices of sell orders. This could occur for many reasons or for no apparent reason. For example, events may trigger buying or selling pressure in a particular security or the market in general. Also simple fluctuations in supply/demand could produce an imbalance at the opening.

In an electronic market that uses a dealer model, a lock/cross condition can exist at the opening. In a locked situation, a market participant enters a quote or order having a bid price that is the same as the best, i.e., lowest displayed offer or enters an offer price that is the same as the best, i.e. highest displayed bid quote price. In a crossed situation, the quote or order bid price for the security is higher than, i.e., crosses the offer quoted price, or conversely the quote or order has an offer price that is lower than the currently best displayed bid price. Locked/crossed conditions are undesirable for maintaining orderly markets.

SUMMARY

According to an aspect of the invention, a method of determining an opening price for a financial product traded in an electronic marketplace is provided. The method is executed over a distributed network computer system, and the method includes detecting a lock/cross condition in the market prior to opening of the market and at a time prior to an official opening time for opening regular trading, removing the lock/cross condition to allow opening of trading in the particular product. Removing includes identifying the oldest of interest at the most aggressive price on each side of the market, selecting the older interest of the identified interest to designate as an incoming order and matching the incoming order against contra side interest for which the incoming order is marketable According to an additional aspect of the invention, a A computer program product for remove a lock/cross condition to allow opening of trading in a security said computer program product residing on a computer readable medium includes instructions for causing a computer to determine when a time just prior to an official opening time for opening regular trading has been reached, and removing the lock/cross condition to allow opening of trading in the particular product. The instructions for removing further includes instructions to identify the oldest of interest at the most aggressive price on each side of the market select the older interest of the identified interest to designate as incoming order and match the incoming order against all contra side interest.

According to an additional aspect of the invention, a system for determining an opening price for products traded over a distributed, networked computer system includes a plurality of workstations for entering orders for financial products into the distributed, networked computer system and a server computer coupled to the workstations for receiving the orders, said server computer executing a server process that determines an opening price for the product. The server process includes instructions that cause the server to determine when a time just prior to an official opening time for opening regular trading has been reached, and removing the lock/cross condition to allow opening of trading in the particular product. The instructions for removing further including instructions to identify the oldest of interest at the most aggressive price on each side of the market, select the older interest of the identified interest to designate as an incoming order and match the incoming order against all contra side interest at the price of the newer of the two orders.

One or more of the following advantages may be provided by one or more aspects of the invention.

The opening price process may provide several advantages for investors and other participants. The opening price process results in an opening price that is rationally related to market forces that exist at the opening. Another advantage is that the process is easier to explain to, and will be better understood by, investors by making results more predictable. This should provide more confidence to investors participating in the market. The process at the same time rewards more aggressive bidders and offerers, while encouraging market participants to enter the market for a given security earlier. Other features include matching interest in a manner that is consistent with intraday trading methodology and eliminating trade through situations. Also with this technique price improvement accrues to older orders.

BRIEF DESCRIPTION OF THE DRAWINGS

FIG. 1A is a diagram showing a format for quotes.

FIG. 2A is a block diagram showing arrangement of an quote/order collector facility.

FIGS. 6A-6B through 10A-10B are diagrams of montages.

DESCRIPTION

Figure 1:
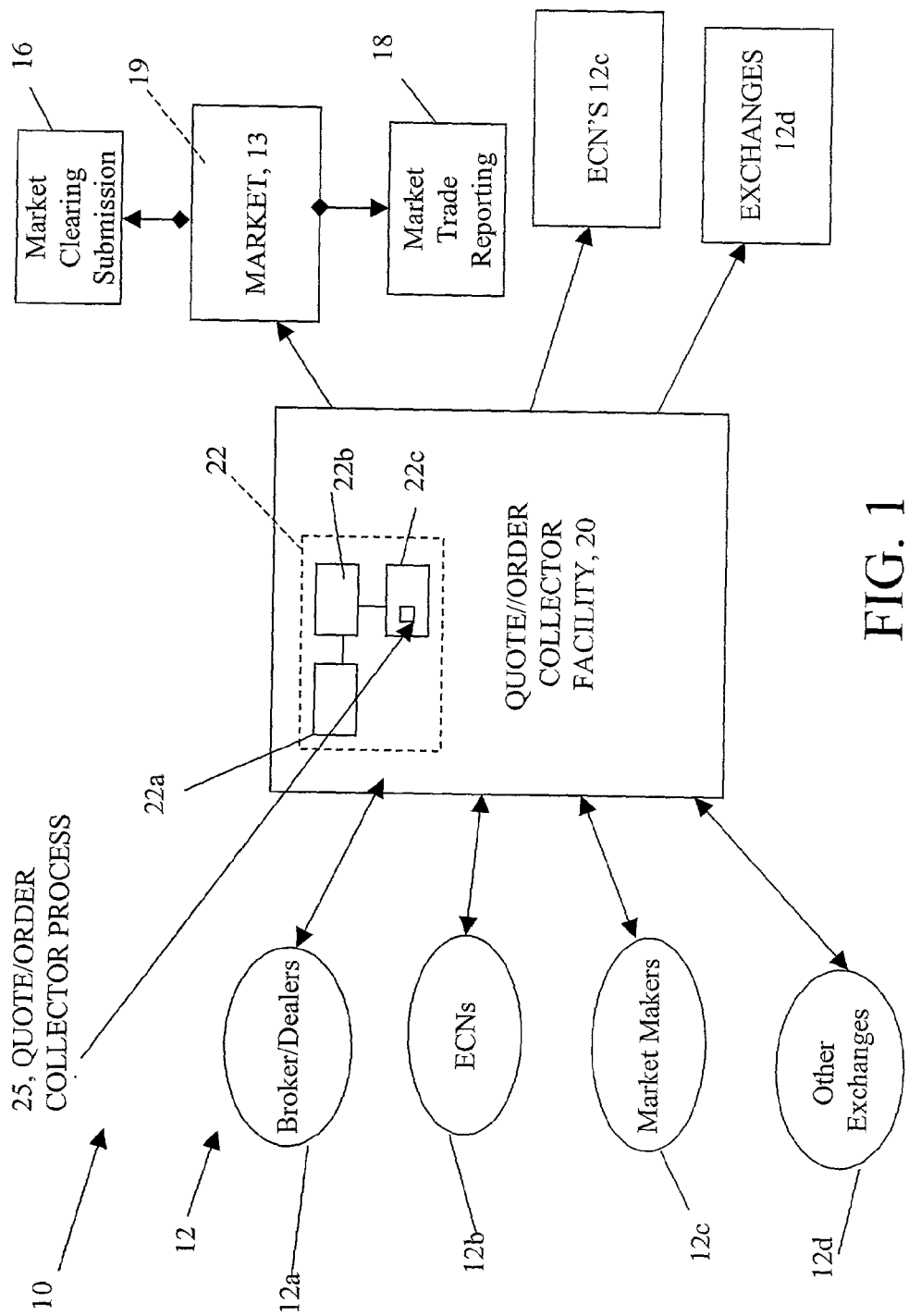
FIG. 1 is a block diagram of a market system.

Referring to FIG. 1, one example of an electronic market 10 is shown. Although the opening process to be described below is applicable in many types of markets the electronic market 10 will be used as an illustrative example. The electronic market 10 includes client systems 12 that access a central quote/order collector facility 20. The client systems 12 can be broker/dealer systems 12a, electronic communication networks (ECN's) 12b, market-marker systems 12c, and other exchanges 12d. The connections can use existing Nasdaq protocols such as SelectNet®, API Nasdaq Workstation II, or equivalent.

The client systems 12 include a processor, memory and a storage device, e.g., a client workstation or personal computer (all not shown) that can include a client process to enter quotes/orders into the electronic market system. The quote/order collector facility 20 causes the order execution or order delivery systems (e.g., SOES® and SelectNet® or an integrated auto-execution and order-delivery system to deliver executions or orders to a market that is coupled to a clearing system 16 and a reporting system 18. It also causes delivery of executions or routing of orders to the ECN's 12c, depending on the status of the ECN, and routing of orders or executions to other markets and exchanges 12d.

The quote/order collector facility 20 is comprised of one or preferably a plurality of server computers generally denoted as 22 including a processor 22a, main memory 22b and storage 22c. The storage system 22c includes quote/order collector process 25 that is executed in memory 22b. In general, server 22 is a complex computer server, the details of which are not important to an understanding of the present invention.

The quote/order collector facility 25 collects pre-trade information in the form of quotes or orders. The distinction between a quote and an order depends on several factors. For example, each a market maker can send a proprietary quote, i.e., a quote that represents its own trading interest or in some embodiments an agency quote that represents trading interest of a sponsored entity. If one proprietary quote is sent it could be considered one order. If one agency quote is sent it also could be considered one order. If an agency quote reflects an aggregation of more than one agency order, however, the aggregate agency order could be considered a quote. Entering quotes are limited to registered market makers 12b and ECNs 12c and possible UTP Exchanges 12d. For any given stock, a registered market maker or ECN may directly enter a non-marketable order, i.e., quote into the system 20 on behalf of its own account or for the account of a customer, or it may sponsor the direct entry of an order by its customer. All sponsored quotes are sent to the quote/order collector facility 20 under the name of the sponsoring market maker or ECN. Every registered market maker or ECN will be permitted to submit an unlimited number of non-marketable quotes to the system 20.

As shown in FIG. 1A, each quote 19 submitted to the system can include a display quote size 19a, a reserve size 19b and an indication 19c (ATTR) of whether the quote size is attributable or non-attributable. Quote size 19a when attributable based on indicator 19c, is directly attributable to the market maker or ECN, and is placed next to its unique market participant ID, and is displayed in a "current quote" montage. Quote size 19b when non-attributable is sized that the market maker or ECN wishes to display to the marketplace through an aggregate montage of the order display window. This quote size 19a is not attributable to the market maker or ECN until it is executed. Reserve size 19b is liquidity that is not displayed to the marketplace but that is immediately accessible through the quote/order collector facility 20. In order to use reserve size 19b, a market maker can be required to have a minimum amount displayed in the aggregate quote size 19a without or with attributable indicator 19c and negotiation quote with attributable indicator 19c asserted.

A broker/dealer can receive an order from a customer. The broker/dealer can send that order to the order collector facility 20 to be executed with quotes that are posted by electronic communication networks, market makers or other markets. In this embodiment, orders of broker/dealers are not posted as quotes.

Order Collection Facility

Referring to FIG. 2A, the quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

The order quote collector facility 20 also includes an interface 21 that couples the order collector facility 20 to existing systems. For example, the interface 21 can couple the order quote collector facility 20 to an order execution system. The interface 21 would provide access to information contained in order flow delivered via the delivery systems to a quote/order collection process 25 described in conjunction with FIG. 2B. The OCF 20 can also include an internal matching/execution engine.

The interface 21 or the process 25 would extract information from the quotes and make that information available to the quote order collector process 25. The quote/order collector process 25 extracts information and process orders in a unified manner to allow the order collector system 20 to be a unifying point of collection of all orders which are sent to the market 10.

The interface 21 can also be used to route executions of liability orders back to market participants whose quotes/orders were executed against and can deliver orders for negotiation against market participants whose quotes are selected for further negotiation e.g., via the SelectNet® system or an equivalent type of system.

Figure 2B:
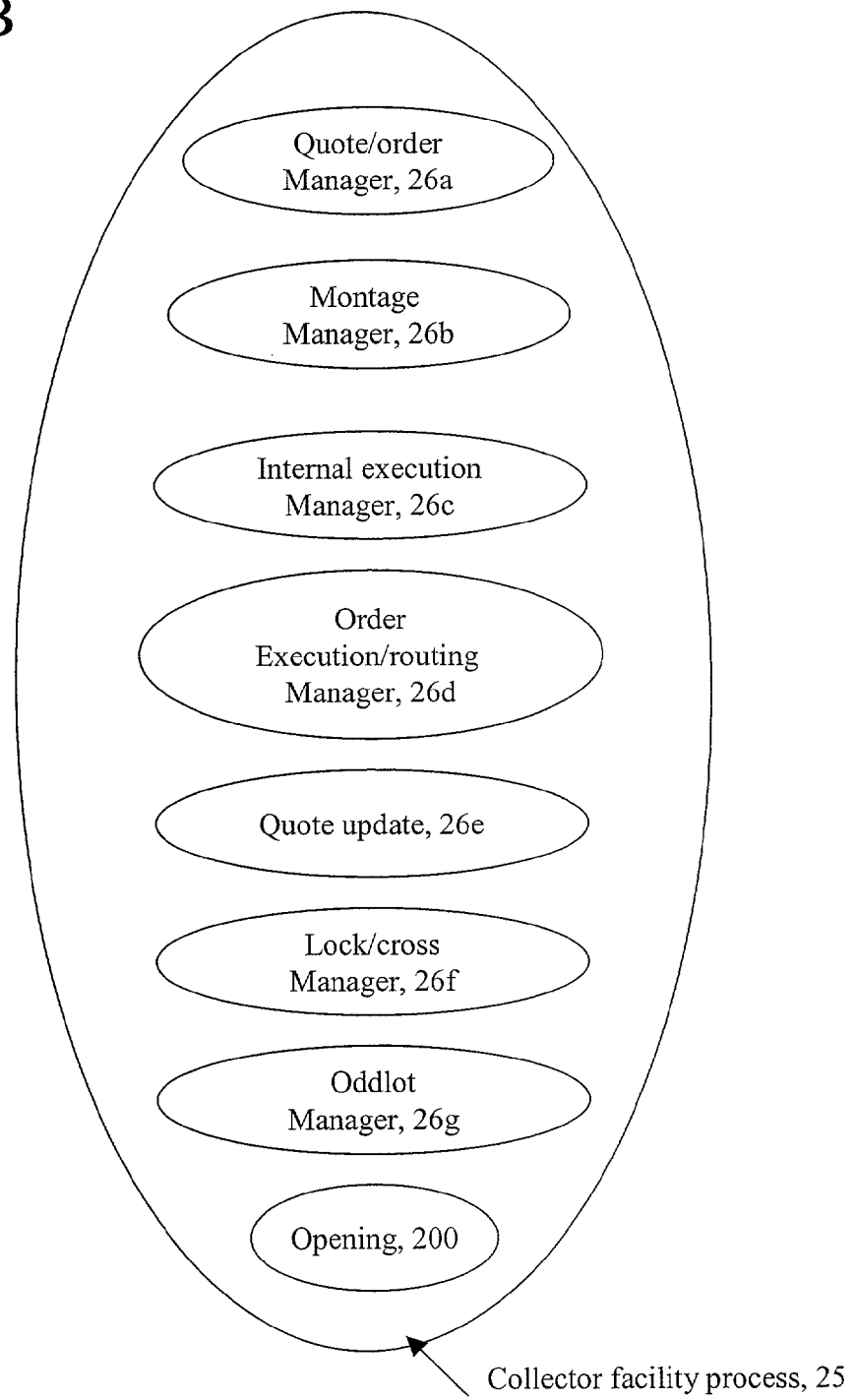
FIG. 2B is a logic view of functions in the quote/order collector facility.

Referring to FIG. 2B, the quote/order collector process ("OCP") 25 is shown. The quote/order collector process 25 provides transmission of multiple orders or quotes at multiple price levels by Quoting Market Participants to a quote/order manager 26a. The quote/order manager 26a provides a unified point of entry of quotes and orders from disparate delivery systems into the quote/order collector facility 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the Aggregate montage or in the current quote montage) the orders/quotes consistent with an order's/quote's parameters.

The order collector process 25 can also include an internal execution process manager 26c to match off executions for quoting market participants at the best bid/offer. Orders can include a qualifier that allows or disallows an order for match-off, e.g., depending on the trading capacity of the order entry participant. The order collector system 20 also includes an order routing/execution manager 26d that provides a single point delivery of executions or routing of orders, which substantially eliminates potential for dual liability. That is in one embodiment, the order collector process 25 maintains the order routing and execution functionality available in the SOES and SelectNet systems.

The order collector process 25 also can also include a quote update manager 26e, a lock/cross quote manager 26f, and an odd lot execution manager 26g in one embodiment. The order collector process 25 also includes an opening process 200. Alternatively the order collector process 25 can include a reference to the opening process that is the opening need not be part of the order collector process 25.

Figure 3A:
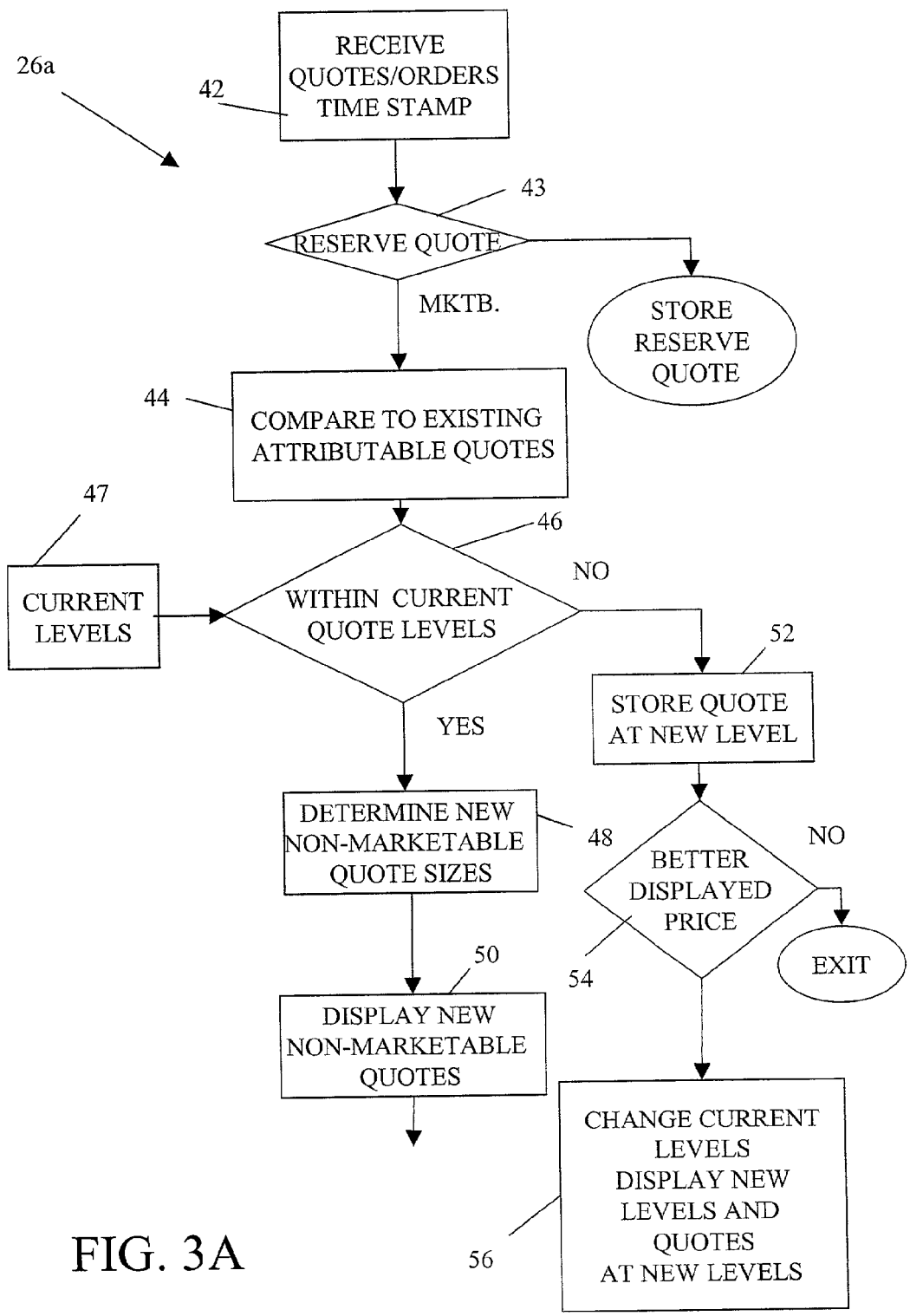
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for interaction with incoming marketable orders. Quotes/orders are designated as either attributable or non-attributable, and could also have a reserve size discussed above. The order collector process 25 aggregates all of a Quoting Market Participant's (i.e., those market participants that are eligible to submit non-marketable quotes/orders for display in the Nasdaq system) attributable and non-attributable orders at a particular price level, and disseminates order/quotation information into the aggregate montage and/or the current quote montage, as will be discussed below.

The order entry process 25 determines 43 whether the received quote/order corresponds to a reserve quote. If the quote does not correspond to a reserve quote then the quote is a displayable quote that is attributable or non-attributable. The order entry process 25 compares 44 the received quotes/ orders to existing quotes/orders to determine 46 whether the price of quotes/orders fall in existing quote/order price levels. Any number of quote/order price levels can be accommodated although, in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level determines 54 if it is at a better price. If the quote is at a better price, the process 25 changes 56 current levels to cause a new price level for non-marketable quote sizes to be displayed 50.

Figure 3B:
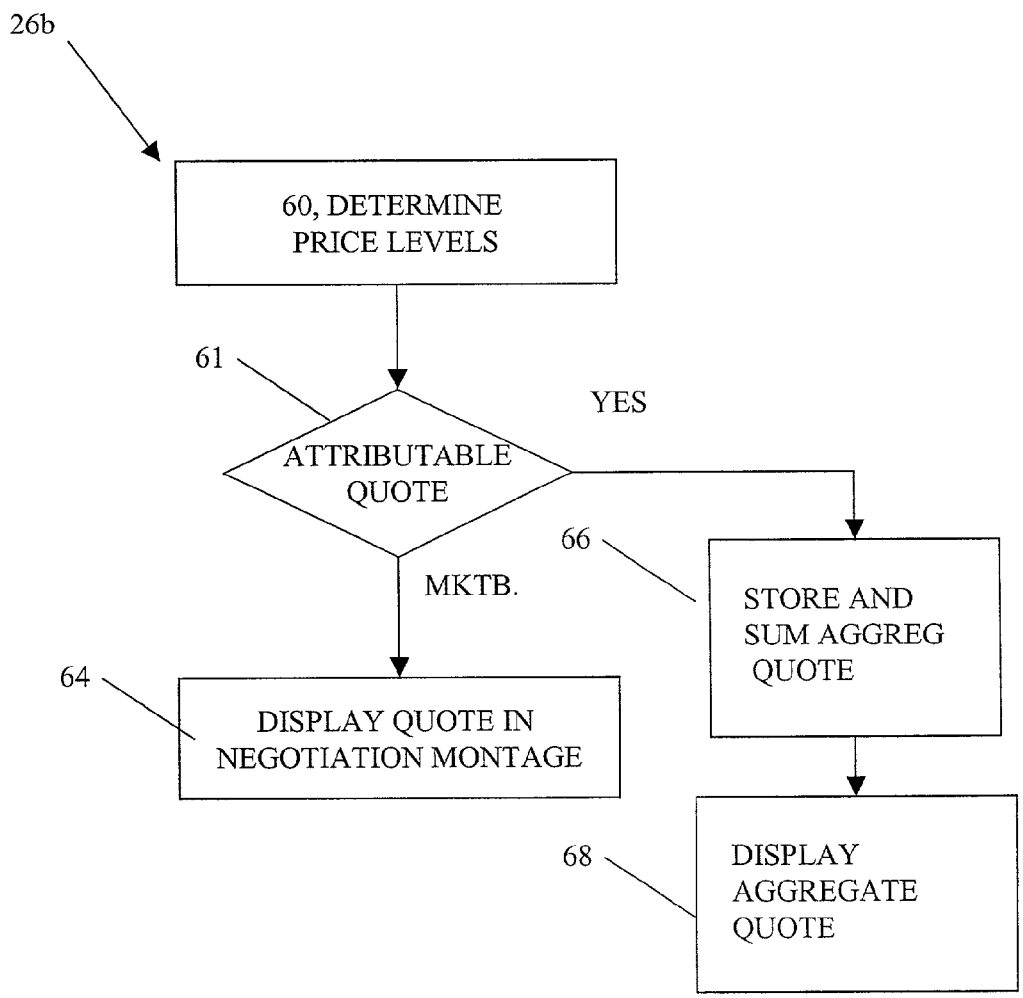
FIG. 3B is a flow chart showing a montage manager.

Referring to FIG. 3B, the montage manager 26b of the quote/order collector process 25 determines 60 which price levels to display 60 and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the, e.g., five top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one unique market participant identification "MPID" and possibly an agency MPID against which they can display attributable quotes. If a market maker has an agency quote, attributable orders will be displayed once the order or orders at a particular price level become the market participant's best agency quote.

For example, MMA sends system 20 five 1,000 shares attributable buy orders at $20 and two 1,000 share non-attributable buy orders at $20, for a total interest of 7,000 shares to buy at $20. At some point, the $20 price level becomes the best bid. In this example, if MMA is alone at the inside bid, system 20 will aggregate all of the orders in the system and display as follows: 7,000 shares in the Aggregate montage; 5,000 shares (the attributable portion) in the current quote montage next to MMA's MPID; and 2,000 (the non-attributable portion) in a "SIZE" MPID.

To access quotes in system 20, therefore, order entry firms, market makers, ECNs, or UTP Exchanges, will enter either a directed or non-directed order into the OCF 25. The order may be of any size. The order indicates whether it is a buy, sell, sell short, or sell short exempt. The order is either a priced order or a market order. The system 20 has a separate odd lot process described below.

Nondirected Orders

A market participant can immediately access the best prices in system 20 as displayed in the aggregate montage, by entering a non-directed order into the OCF 25. A non-directed order is an order that is not sent/routed to a particular Quoting Market Participant. A non-directed order is designated as a market order, marketable limit order, or limit order. If marketable, a Non-Directed Orders is routed to the next Quoting Market participant in queue for delivery or execution, and is considered a "Liability Order" and treated as such by the receiving market participant. Additionally, the order entry participant can obtain the status of the order and request a cancel of such order. Further, in some embodiments, the market 10 allows market participants that enter Non-Directed Orders three options as to how the order interacts with the quotes/orders in the system 20. These choices are that the orders can execute against displayed contra side interest in strict price/time; or price/size/time; or price/time that accounts for ECN access fees.

Upon entry, the OCF 25 will ascertain what market participant is the next Quoting Market Participant in queue to receive an order based on the entering MP's ordering choice, and depending on how that receiving Quoting Market Participant participates in system 20 (i.e., automatic execution v. order delivery), the OCF 25 will either cause delivery of an execution or delivery of a Liability Order.

Also in some embodiments, the market 10 can have a class of orders referred to as preferenced orders. A preferenced order is an order that is preference to a particular quoting market participant e.g., market maker or ECN. Preferenced Orders can be of two types price restrictions or no price restrictions. Preferenced Orders of either type are entered into the system 20 through the Non-Directed Order Process. The market participant entering the Preferenced Order designates the quoting market participant by its identification symbol ("MPID"). Preferenced Orders are processed in the same "queue" as Non-Directed Orders and are sent from the queue when the preferenced quoting market participant quote satisfies the order.

Order Execution Manager

Figure 4A:
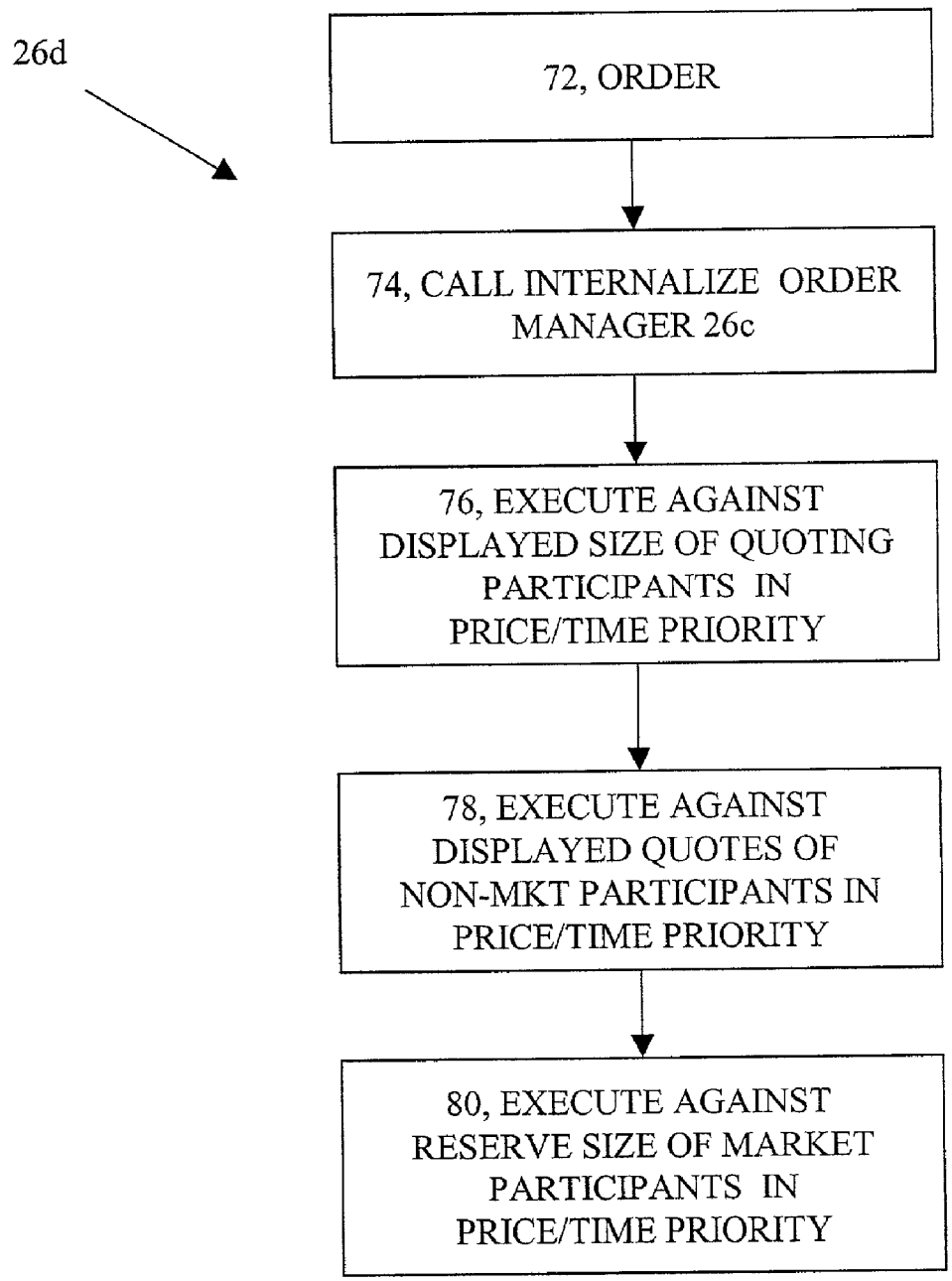
FIGS. 4A-4B are flow charts of an execution/routing manager.

Referring to FIG. 4A, an exemplary order execution/routing manager 26d executes non-directed orders against Quoting Market Participant's quotes/orders based on, e.g, price/time priority. As noted above, other priorities can be used and the execution/routing manager 26d would be so modified. Each quote/order when entered into the OCF 25 receives a time stamp. The order execution/routing manager 26d will deliver all orders at the best bid/best offer generally in strict time priority based on the time stamp of the order/quote, subject to the order execution choice, preferencing features, and self matching feature, with the exception that order execution/routing manager 26d will first attempt to provide a match off of orders/quotes entered by a Quoting Market Participant if the participant is at the best bid/best offer by calling 74 an internal execution manager 26c. Thus, the order execution/routing manager 26d will call the internal order execution manager 26c to try to match off a Quoting Market Participant's orders and quotes that are in the system if the participant is at the BBO and receives a market or marketable limit order on the other size of the market.

Generally, the order execution/routing manager 26d will attempt to execute 76 against all displayed size (attributable and non-attributable) at a particular price level for market participants such as market makers and ECN's. There does not need to be an interval delay between the delivery of executions against a market maker's quote (assuming the market maker has size to access) because all Quoting Market Participants may quote their actual size and may give multiple orders and price levels. As shown herein the market maker proprietary orders receive preference over agency orders. However, preference could be given to agency orders before market maker orders.

Once displayed size in system 20 is exhausted, the order execution/routing manager 26*d* will attempt to access the quotes of UTP Exchanges. After accessing the displayed size of Quoting Market Participants and UTP Exchanges 78, order execution/routing manager 26*d* will attempt to execute 80 against the reserve size of Quoting Market Participants generally in price/time priority, subject to the exceptions noted above.

In an alternate embodiment, the order execution/routing manager 26*d* can distinguish between exchanges that support auto execution and exchanges that do not support auto execution giving preference for the former. Additionally, in such an embodiment, UTP exchanges can have reserve size and the system 20 can distinguish between exchanges that support auto execution and those ECN's, and then exchanges that do not support auto execution.

In another embodiment the order execution/routing manager 26*d* can first access quotes of market makers and auto-execution ECN's, next access quotes of market makers and ECN's for delivery of orders, then the reserve size of market makers and ECN's and UTP exchanges. Other arrangements priorities, etc. are possible taking into consideration how participants participate in the market 10, choices of how orders interact in the market 10, the system or customer choices.

Figure 4B:
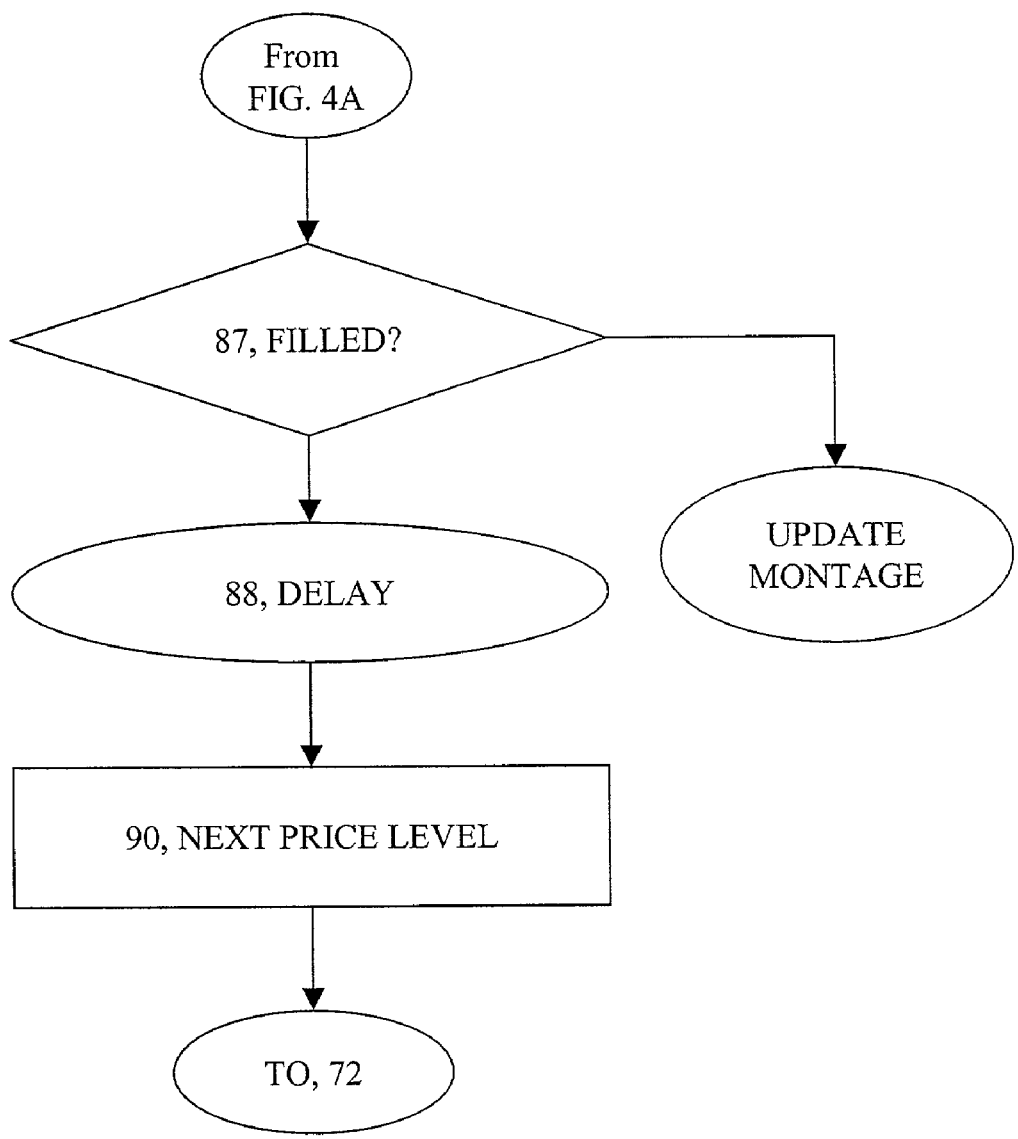

Referring to FIG. 4B, if the order is not filled 87, the order execution/routing manager 26*d* will move 90 to the next price level, immediately in one embodiment, or in another embodiment, after a predefined delay, e.g., a 5 second interval delay 88 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility.

In one embodiment, for non-directed orders that are mixed orders or odd lot orders the collector facility process 25 (FIG. 2B) calls an odd-lot execution manager 26*f*. In another embodiment, odd lot and mixed lot orders can be processed in the normal non-directed order process using an actual share process that allows mixed or odd lots to be executed with as round lots and which allows a montage to be updated in round lots, with any remainder being held in the system available for execution but not displayed.

The processes described above are typically executed throughout a trading day. However, to open a market, e.g., start trading in a security, it is sometimes necessary to establish an opening price on both sides of the market and to remove interest in the market that interferes with an orderly opening. For example, often pre-open interest can collect in the system and that interest can create a locked or crossed market. The opening process described below can be used to remove, (e.g., execute) such interest that blocks an orderly opening.

Opening Price Process

Figure 5:
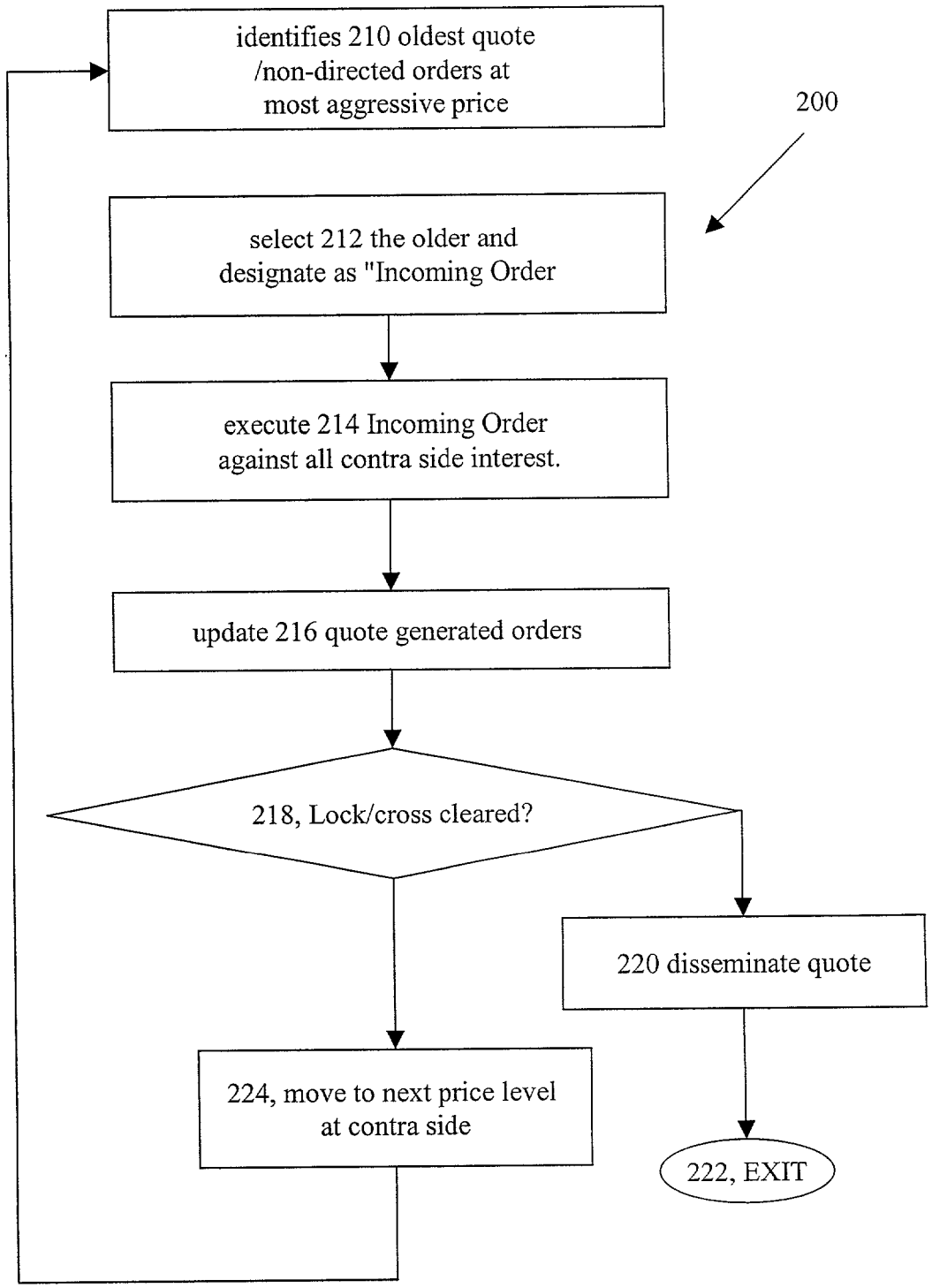
FIG. 5 is a flow chart showing an opening process.

Referring to FIG. 5, a process 200 for determining an opening price for a product such as a security is shown. Starting at just prior to the officially designated opening time for the market, e.g., at 9:29:30 for a market that opens at 9:30, the process 200 starts resolving any outstanding locks/crosses by automatically executing any overlapping buy and sell quotes/orders using the most aggressively priced matching discussed below. At the end of this process 200, which is completed before 9:30:00 market open, all locked/crossed markets are eliminated. The process 200 can be used in automated trading systems, markets or exchanges that receive quotes or orders prior to the opening of trading for the day. The process 200 is useful for example in the market system 10 of FIG. 1. The process 200 can be used to start trading in a security and can use or be part of the order collector facility 20 and order collector process 25 of FIGS. 2A, 2B.

The opening process 200 generally works on a security, i.e., market basis. Prices for orders or quotes are entered into the system prior to market or exchange opening. Prior to opening, the market 10 detects a lock/cross condition amongst orders or quotes in the system. The market 10 will call the opening process 200 to remove the lock/cross condition to allow opening of trading in the particular security.

The opening process 200 identifies 210 all quote-generated and non-directed, priced orders. The process 200 pairs either the highest bid against the lowest offer(s) against which the highest bid is marketable, if the bid is the oldest in time of that pair or, the lowest offer against the highest bid(s) against which the offer is marketable, if the offer is the oldest in time of that pair. That is, priority for matching overlapping trading interest goes to the most aggressively priced buy and sell orders.

The most aggressive orders in this example would be the order having the highest bid price and the order having the lowest offer price. When the most aggressive bid price equals the most aggressive offer price the market is said to be locked. When the most aggressive bid price exceeds the most aggressive offer price the market is said to be crossed. Neither, condition is desirable for maintaining orderly markets.

Once the most aggressively "best-priced pair" is identified, the opening process 200 designates 212 the oldest order of this buy and sell pair as the "incoming order" and proceeds to execute 214 against that incoming order, just prior to the regular scheduled market open. For example, the executions can occur at, e.g., 30 seconds before the normal open or at such other time prior to open as is needed to clear the condition and make sure that the OCF 20 can proceed to a normal open of the market 10. The process 200 will execute 214 the "incoming order" against all executable displayed size in price/time priority. If displayed size becomes exhausted 216 at that best priced level, the process 200 will continue to execute against reserve size at that level in the same order that the process 210 executed displayed size.

All resulting executions will be based on the price of the newer quotes and orders being accessed and all price-improvement, if any, shall accrue to the older so called "incoming order", meaning the two quotes/orders are executed at the price of the newer quote/order. The execution 214 will be repeated until at opening, an unlocked and uncrossed market results 218.

All trades generated by the process 200 are designated with a symbol (e.g., ".T") to reflect that they were executed outside of normal market hours. In one embodiment, market orders and immediate or cancel orders (IOC) limit orders do not participate in this pre-open execution process 200 and are held in a remainder queue (not shown) until the market open, e.g., 9:30 a.m. Once the opening process 200 has commenced all quotes/orders subsequently submitted, and any quotes/orders previously submitted that were not recognized by the OCF 20 at the time the process 200 commenced (e.g., market orders and IOC limit orders) are held in the remainder queue for processing after opening.

Orders placed into the "SIZE MMID" will participate in this process and be subject to potential execution.

After completion of the opening process, the system 10 processes the queue of remaining quotes/orders. One priority for processing this queue is:

Quotes/orders in the remainder queue that do not lock/or cross the market are placed in the system and become available for potential execution at the market's official opening time. Once the process 200 has removed all locked and crossed markets, the system ensures that no new locked or crossed markets for that or other securities are produced by quotes/orders not in the remainder queue before the 9:30 a.m. open. The OCF 20 processes any queued quotes/orders received while the pre-market execution process 200 completes, and any quotes/orders that subsequently arrived before the 9:30 open as follows:

The OCF will place all market and IOC limit orders in the time-priority queue as all other market and IOC limit orders submitted earlier during the pre-market period. These orders are held for market open.

The OCF 20 retains and displays any non-IOC limit orders that do not produce a new locked or crossed market for potential execution. Those non-IOC limit orders that would produce, or re-produce, a locked or crossed market will be immediately executed by system 10 in a pre-market period as ".T" trades after being matched against the most-aggressively priced quote/order on the other side of the market. Like the pre-market execution process, all price improvement accrues to oldest side of the pair of best-priced buy and sell interest (i.e., the orders are executed at the price of the newest order in time order). At 9:30 a.m. Eastern Time, the market disseminates a "Market Open" message, and normal trading commences. The time-priority queue of market and IOC orders will immediately begin to be processed until the queue is exhausted.

These actions ensure that the markets in individual securities remain unlocked or uncrossed into the 9:30 market open. At 9:30:00 a.m., the market 10 can disseminates a "Market Open" message and normal trading can commence.

If the condition was removed, the process disseminates 220 opening bid and offer quotes, which are the quotes that remain at the top of the bid and offer sides of the market. The opening process 200 exits 222. If the condition has not been removed the process repeats for the next price level 224.

Several advantages are provided from this type of opening process 200. The opening process 200 is an integrated process that can ensure that quotes in securities are not locked or crossed at the start of normal trading. In addition, the process 200 using pre-market executions on the prices of individual quotes/orders provides flexibility for market participants to price and potentially execute their own trading interest while still maintaining an orderly market going into the open of the market.

The process 200 at the same time rewards more aggressive bidders and offerers, while encouraging market participants to enter the market for a given security earlier. Other features include matching interest in a manner that is consistent with intraday trading methodology. Below are several examples of the opening process.

Referring to FIGS. 6A and 6B, in this scenario quotes from market participants GSCO, MLCO and FBCO lock/cross the market (FIG. 6A). The "t" designations next to the quote indicates a time stamp with the lower number being the oldest. The process 200 will match quotes at t1 and t11 for 1000 shares @ 20.03 per share and t2 and t12 for 1000 shares @ 20.03. The price improvement of 0.01 will accrue to the quotes of MADF and RSSF since those quotes are earlier in time than that of MLCO and FBCO. Thereafter, the locked condition is cleared and the process can disseminate a bid quote of 20.02 at 2000 shares, and an offer quote of 20.04 at 500 shares. The montage will have the values displayed as in FIG. 6B with the locked quotes GSCO, MLCO and FBCO trading interest cleared and the quote summary updated.

Referring to FIGS. 7A and 7B, in this scenario quoting market participant MLCO enters a bid that crosses the market (FIG. 7A). The process 200 matches t3 and t11 for 500 shares @ 20.04, which clears the cross condition leaving FBCO at $20.01 on the bid side for a size of 1,000 and MADF on the offer side at $20.02 with a size of 500 (FIG. 7B).

The system 10 would generate the following execution report.

| Execution reports: | | | |
|---|---|---|---|
| Buyer | Seller | Size | Price |
| MLCO | MADF | 500 | $20.04 |

Referring to FIGS. 8A and 8B, in this scenario MLCO enters a bid that crosses the market. Participant MADF increases its original offer (t3) by 3500 shares (t13) (FIG. 8A). The process 200 matches t3 and t11 for 1000 shares @ 20.04, matches t13 and t11 for 3500 shares @ 20.02 and matches t2 and t11 for 500 shares @ 20.04. These matches clear the lock/cross condition leaving FBCO at $20.01 on the bid side for a size of 1,000 and RSSF offer @ $20.03 with a size of 500 (FIG. 8B).

Referring to FIGS. 9A and 9B, in this scenario GSCO, MLCO and FBCO enter bids that lock/cross market. This is example where there are a large number of bids/offers locked/crossed (FIG. 9A). The process 200 matches t3 and t21 for 1000 shares @ 20.10, matches t15 and t20 for 1000 shares @ 20.09, matches t16 and t19 for 500 shares @ 20.09; matches t4 and t19 for 300 shares @ 20.09; matches t17 and t19 for 300 shares @ 20.09; matches t18 and t19 for 400 shares @ 20.09; matches t10 and t20 for 200 shares @ 20.09; matches t13 and t20 for 100 shares @ 20.09; matches t8 and t20 for 400 shares @ 20.09; and matches t6 and t20 for 300 shares @ 20.09. These matches clear the lock/cross condition leaving ECN1 # at $20.01 with a size of 1,000 on the bid side and participant MM4 at $20.08 with a size of 200 (FIG. 9B).

Referring to FIGS. 10A and 10B, in this scenario display and reserve size are traded together. In this example, the market 10 operates with the option of allowing reserve size. Reserve size 19b is liquidity that is not displayed to the marketplace but that is immediately accessible through e.g., the quote/order collector facility 20, as described above. It is illustrated here for explanatory reasons, in this embodiment it is not displayed to the market. In other embodiments, reserve size or interest could be shown, or could be reflected in aggregate interest.

In the example of FIGS. 10A and 10B, participants MLCO, FBCO, and GSCO on the bid side and participants MADF, RSSF, and SBSH, are crossing the market on the offer side (FIG. 10A). The process 200 matches t2 with t10 for 4500 shares @ $20.02; t3 with t10 for 1500 shares @ $20.02; t3 with t12 for 500 shares @ $20.03; t11 with t12 for 2500 shares @ $20.03; and t11 with t1 for 1000 shares @ $20.04. These matches clear the lock/cross condition leaving ECN1 # at a bid of $20.01 for a size of 1,000 and a reserve of 0, and participant SBSH at a offer of $20.04 for a size of 500 displayable and a reserve of 4,000 that is not displayed (FIG. 10B). Alternatively, SBSH's offer can be auto-refreshed and display a size of 1000 at $20.04 and retain a reserve of 3500.

The market 10 would generate the following execution report.

| Execution Reports: | | | |
|---|---|---|---|
| Buyer | Seller | Quantity | Price |
| MLCO | MADF | 4500 | $20.02 |
| FBCO | MADF | 1500 | $20.02 |
| FBCO | RSSF | 500 | $20.03 |
| GSCO | RSSF | 2500 | $20.03 |
| GSCO | SBSH | 1000 | $20.04 |

Other Embodiments

Other embodiments are within the scope of the claims. For example the process can be used with other products that have a value that can change over short periods of time in accordance with fluctuations in market conditions.

What is claimed is:

1. A computer-implemented method of determining an opening price for a financial product traded in an electronic marketplace, the method comprising:
   using a computer system in the electronic marketplace to detect a locked or crossed condition in a market served by the electronic marketplace prior to opening of the market; and
   at a time prior to an official opening time for opening regular trading, the time prior to an official opening time for opening regular trading, being about 30 seconds prior to the official opening time for regular trading, the computer system automatically removing the locked or crossed condition to allow opening of trading in the particular product by:
      pairing by the computer either the highest bid against the lowest offer(s) against which the highest bid is marketable, if the bid is the oldest in time of that pair or, the lowest offer against the highest bid(s) against which the offer is marketable, if the offer is the oldest in time of that pair;
      identifying an oldest order of this pair as an incoming order;
      matching the incoming order against contra side interest, with contra side interest comprising quotes and/or orders that are displayable with matching occurring according to a priority;
      disseminating, over a distributed computer system network, prices of the interest that remain at the top of each side of the market as opening bid and offer prices; and
      queuing any remaining quotes and/or orders (quotes/orders) submitted after the removing of the locked or crossed condition has commenced in a time-priority queue.

2. The method of claim 1 wherein a queue of remaining quotes/orders processes those quotes/orders that do not lock or cross the market.

3. The method of claim 2 wherein orders or quotes in the queue that would lock or cross the market are immediately executed by the system.

4. The method of claim 1 wherein executions that occur during removal of the locked or crossed condition are designated as by a symbol indicating that they are after hours trades.

5. The method of claim 2 wherein market orders, immediate or cancel orders, and limit orders are held in a queue until the market open.

6. The method of claim 2 further comprising:
   after opening of the market executing any remaining interest in a particular priority.

7. The method of claim 6 wherein the priority is first by price and next by time (Price/Time) priority.

8. The method of claim 2 wherein quotes/orders exist at multiple price levels on each side of the market and, for each price level displayed interest at a particular price level is executed first before moving to another price level.

9. The method of claim 2 wherein interest exists at multiple price levels on each side of the market and at each price level, all displayed interest is executed first followed by any reserve size before moving to another price level.

10. The method of claim 9 wherein the reserve size is executed in the order in which displayed size was executed.

11. The method of claim 1 wherein the sides of the market are a bid side and an offer side.

12. The method of claim 1 wherein executions occur at the price of the designated incoming order so that any price improvement accrues to the incoming order.

13. The method of claim 1 wherein after an execution occurs, the method further comprises:
   updating quote-generated orders.

14. The method of claim 1 further comprises:
   testing whether the locked or crossed condition has been removed; and
   if the condition was removed, disseminating an opening price for the product.

15. A computer program product for removing a locked or crossed condition to allow opening of trading in a security, said computer program product tangibly embodied on a non-transitory computer readable medium comprising instructions for causing a computer to:
   determine when a time just prior to an official opening time for opening regular trading has been reached, the time prior to an official opening time for opening regular trading, being about 30 seconds prior to the official opening time for regular trading, and removing the locked or crossed condition to allow opening of trading in the particular product, with instructions for removing further comprising instructions to:
      produce a pair of either the highest bid against the lowest offer(s) against which the highest bid is marketable, if the bid is the oldest in time of that pair or, the lowest offer against the highest bid(s) against which the offer is marketable, if the offer is the oldest in time of that pair;
      identify an oldest order of this pair as an incoming order;
      match the incoming order against all contra side interest, with interest comprising quotes and/or orders that are displayable with matching occurring according to a priority;
      disseminate, over the distributed computer system network, prices of the interest that remain at the top of bid and offer sides as opening bid and offer prices; and
      queue any remaining quotes and/or orders (quotes/orders) submitted after removing of the locked or crossed condition has commenced in a time-priority queue.

16. The computer program product of claim 15 further comprising instructions to cause the computer to:
   match at a price of the incoming order so that any price improvement accrues to the incoming order.

17. The computer program product of claim 15 wherein interest exists at multiple price levels on each side of the market and the instructions match interest at each price level, all displayed interest at the particular price level before matching interest at another price level.

18. The computer program product of claim 15 further comprises instructions to:

test whether the locked or crossed condition has been removed; and if the condition was removed, disseminate an opening price for the product.

19. A system for determining an opening price for products traded over a distributed, networked computer system, said system comprising:

a server system coupled via a network to workstations, the server system for receiving orders, the server system executing a server process that determines an opening price for a particular product, the server process comprising instructions that cause the server system to:

determine when a time just prior to an official opening time for opening regular trading has been reached, the time prior to an official opening time for opening regular trading, being about 30 seconds prior to the official opening time for regular trading, and removing a locked or crossed condition to allow opening of trading in the particular product, with instructions for removing further comprising instructions to:

produce a pair by the computer of either the highest bid against the lowest offer(s) against which the highest bid is marketable, if the bid is the oldest in time of that pair or, the lowest offer against the highest bid(s) against which the offer is marketable, if the offer is the oldest in time of that pair;

identify an oldest order of this pair as an incoming order;

match the incoming order against all contra side interest, with interest comprising quotes and/or orders that are displayable with matching occurring according to a priority;

disseminate, over the distributed computer system network, prices of the interest that remain at the top of the hid and offer sides as opening hid and offer prices; and queue any remaining quotes and/or orders (quotes/ orders) submitted after removing of the locked or crossed condition has commenced in a time-priority queue.

20. The computer program product of claim 15 wherein the instructions further cause the computer to:

immediately execute the queued orders or quotes that would lock or cross the market.

21. The computer program product of claim 15 wherein the instructions further cause the computer to:

apply a designated symbol indicating executions that occur during removal of the locked or crossed condition as after hours trades.

22. The computer program product of claim 15 wherein the instructions further cause the computer to:

queue market orders, immediate or cancel orders, and limit orders in a queue until the market open.

\* \* \* \* \*